Patented May 6, 1941

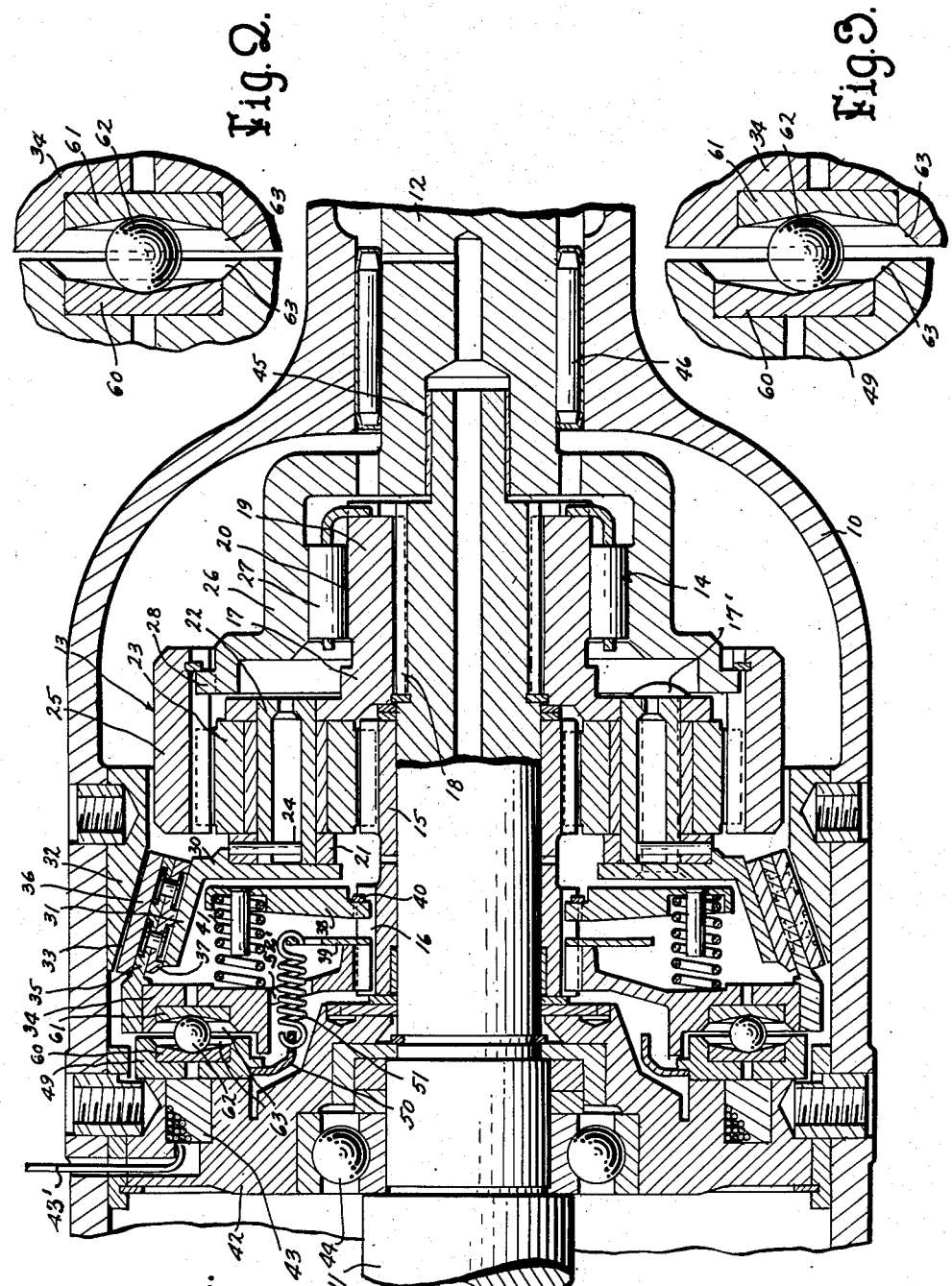

2,241,088

UNITED STATES PATENT OFFICE 2,241,088

MOTOR VEHICLE

Walter R. Griswold, Detroit, Mich., assignor to Packard Motor Car Company, Detroit, Mich., a corporation of Michigan Application July 16, 1940, Serial No. 345,800

8 Claims. (Cl. 74—290)

This invention relates to drive mechanism and more particularly to change speed mechanism.

An object of the invention is to provide a control for a planetary gearing in a drive mechanism so that the drive therethrough can be readily shifted back and forth between a direct drive and a modified drive.

Another object of the invention is to provide mechanism for controlling the drive through planetary gearing that can be operated by power and with small movement.

A further object of the invention is to provide a control for planetary gearing in which the sun gear can be held stationary or the gearing held to rotate as a unit by means of power operated servo mechanism.

Still another object of the invention is to provide a servo actuated control for planetary gearing that will respond quickly and forcefully to effect different operating conditions.

Other objects of the invention will appear from the following description taken in connection with the drawing, which forms a part of this specification, and in which:

Fig. 1 is a fragmentary sectional view of drive mechanism incorporating the invention;

Fig. 2 is an enlarged fragmentary view of the servo mechanism in one driving position of the mechanism;

Fig. 3 is a view similar to Fig. 2 with the servo mechanism in another driving position of the mechanism.

In the drawing, drive mechanism is arranged in a casing 10 and consists generally of a drive shaft 11 and a driven shaft 12 that can be connected by planetary gearing 13 and a one-way overrunning clutch 14. The drive shaft can be connected directly with a power plant or it can be driven from the power plant at a plurality of speeds.

The planetary gearing consists of a sun gear 15 loosely mounted on the drive shaft and having a forwardly extending splined portion 16. A carrier 17 is splined at 18 to the drive shaft and has a hub extension 19 formed with a plurality of peripheral cam surfaces 20. Fixed to the forward end of the carrier by suitable fastening means is a carrier ring 21 and this ring and the carrier provide a mounting for shafts 22 on which planet pinions 23 are loosely mounted. The shafts 22 are fixed with the carrier ring by pins as indicated at 24. The planetary gearing also includes ring gear 25 and the planet gears mesh with the ring gear and the sun gear. The driven shaft 12 has an enlarged hollow forward end 26 that telescopes and is spaced from the cam surfaces 20 on the carrier extension hub, and between such cam surfaces and the adjacent inner periphery of the enlarged extension are arranged rollers 27. These rollers act to provide a one-way overrunning driving connection between the carrier and the driven shaft whereby there will be direct drive from the drive shaft to the driven shaft because the carrier is keyed to the drive shaft. The forward end of the driven shaft extension 26 is formed with teeth 28 that mesh with the teeth of planetary ring gear 25.

Control mechanism is provided to control the drive through the planetary gearing. As shown, this control mechanism for the planetary gearing is selected to hold the sun gear stationary or to lock the carrier with the sun gear, however the control mechanism can be used alone for either purpose. When two members of the planetary gearing are locked together there will be direct drive established through the planetary gearing from the drive shaft to the driven shaft. When the sun gear is held stationary then the drive through the planetary gearing from the drive shaft to the driven shaft will be modified and in the present instance the gear teeth are of such a character that an overdrive would be established. The one-way overrunning clutch is desirable in this driving arrangement because it will establish a direct drive between the shafts more quickly than is possible when control of the planetary gearing is actuated to change the drive, thus the one-way clutch establishes drive directly between shafts 11 and 12 while the drive through the planetary gearing is being changed.

In the mechanism for controlling the planetary gearing there is a clutch member 30 fixed to the planetary carrier ring 21 by the same fastening means that secures the ring with the carrier 17 and such fastening means can be in the form of bolts or rivets 17'. The specific form of clutch member is provided with a forward cone flange 31, and fixed to the casing 10 surrounding such cone surface is a brake member 32 having a conical face 33 parallel with the conical flange of the clutch member.

A control member 34 is slidably splined on the forward extension 16 of the sun gear and is arranged with a rearwardly extending conical portion that extends between the conical faces of the brake and clutch elements. Suitable friction rings 36 and 37 are riveted to the opposite faces of this conical portion of the control member. Forward and rearward shifting of the control member is limited by the clutch and brake members. Spring retainer members 38 and 39 are splined to the forward extension of the sun gear rearwardly of the control member. The member 38 engages a split ring 40 snapped in a groove in the sun gear member, and between this member 38 and the control member is arranged a plurality of coil springs 41 that normally urge the control member forwardly to engage the friction ring 37 with the clutch member 34. The control member 30 is moved rearwardly to engage the brake member 32 by power means which, in this instance, is in the form of a magnet 42 having winding 43 in the rear portion thereof and connected by a conductor 43' with a suitable source of electrical supply under suitable control. This magnet also serves to receive the bearing 44 in which the drive shaft 11 is supported. The drive shaft is also supported in roller bearings 45 arranged within a recess in the driven shaft and the driven shaft is mounted in bearings 46 in the tail end of casing 10.

Arranged adjacent the forward end of the control member is an actuator in the form of a ring armature 49, and bearing against a flange projecting inwardly from the armature is arranged an anchor ring 50 to which a plurality of coil springs 51 are fixed. The other ends of these springs 51 are anchored to the retainer member 39. It will be noted that the control member is provided with a plurality of openings 52' through which the springs 51 can project. In order to more quickly and forcefully move the control member rearwardly when the magnet is energized, a servo connection means is provided between the adjacent faces of the armature and the control member. Such faces are formed with recesses arranged to register and receive hardened inserts 60 and 61. The adjacent faces of these inserts are conical in form and servo balls 62 are arranged to bear against the conical faces of such sets of inserts. The adjacent faces of the armature and the control member beyond the inserts are chamfered for clearance as indicated at 63. The springs 51 serve to hold the armature and the control member together to retain the servo balls 62 in the recesses and normally in a centered position against the cone surfaces of the inserts. The springs 41 serve to urge the control member to the foremost position as allowed by its engagement with the clutch member 30, and in such position the armature will be spaced slightly from the magnet.

When the magnet is energized it will hold the armature 49 stationary and the servo balls 62 will ride out of their centered position against the cone surfaces of the inserts 60 and 61 and will thereby force the control member rearwardly to engage the friction ring 36 on the control member with the brake member 32 that is fixed to the casing 10. Under such circumstance the control member is held by the brake member 32 and in turn holds the sun gear from rotation so that drive from shaft 11 will pass to the planet carrier and the planet gears will idle around the sun gear and rotate the ring gear 35 in an overdrive relation with respect to shaft 11, such drive being transferred to the driven shaft 12 due to the engagement of the teeth 28 of the driven shaft with the ring gear 25. When the magnet is deenergized springs 41 act to engage the control member with the clutch member 30 to thus lock the planetary carrier and the sun gear together, whereupon there will be a direct drive from the drive shaft 11 through the planetary gearing to the driven shaft 12.

The normal position of the servo mechanism is shown in Fig. 2 with the balls 62 centered in the conical faces of the inserts in the armature and the control member. In Fig. 3 the magnet has been energized and the armature is being held so that the servo balls are off-centered to thus move the control member rearwardly sufficiently to engage the friction member 36 with the brake member 32. A very small movement of the control member is necessary in shifting from between the clutch member and the brake member.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In drive mechanism having a casing in which drive and driven shafts are connected by planetary gearing, control mechanism for the planetary gearing comprising a clutch member fixed to one member of the planetary gearing, a brake member fixed to the casing, a shiftable control member slidably splined to a member of the planetary gearing other than that to which the clutch member is fixed, said control member being shiftable to engage either the brake member or the clutch member, an armature member adjacent the control member, servo means operable between said control member and said armature member, electromagnetic means operable to shift said armature in one direction, and spring means operable to move said armature member oppositely to movement by said electromagnetic means.

2. In drive mechanism having a casing in which drive and driven shafts are connected by planetary gearings, control means for the planetary gearing comprising a brake member fixed to the casing, a control member slidably splined on the planetary gearing sun gear and engageable with said brake member, an armature actuator adjacent the control member, servo means intermediate said armature actuator and said control member, spring means engaging said plate and said control member to normally disengage said control member, and electromagnetic means operable to bias said spring means and hold said armature stationary.

3. In drive mechanism having a casing containing drive and driven shafts connected by planetary gearing, control mechanism for establishing direct or modified drive through the planetary gearing comprising a member slidably splined to the planetary sun gear, a clutch member fixed to the planetary gearing planet gear carrier, a brake member fixed to the casing, an actuator armature adjacent the slidably splined member, servo mechanism between said slidably splined member and said actuator armature, spring means acting to normally urge said slidable member into engagement with the clutch member, and electromagnetic means operable on said armature to engage said slidable member with said brake member.

4. In drive mechanism having a casing containing drive and driven shafts connected by planetary gearing, control mechanism for establishing direct or modified drive through the planetary gearing comprising a control member slidably splined to the planetary gearing sun gear, a clutch member fixed to the planetary gearing planet gear carrier, a brake member fixed to the casing, an armature having a servo connection with the control member, magnet means operable to hold the armature whereby the servo connection engages said control member with said brake member, and a spring opposing engagement of the control member with the brake member and normally engaging the control member with the clutch member.

5. In drive mechanism having a casing in which drive and driven shafts are connected by planetary gearing and an overrunning clutch, control means for the planetary gearing to modify the drive between the shafts comprising a brake member anchored to the casing, a control member slidably splined to the planetary sun gear, and engageable with the brake member, an armature, the adjacent faces of said control member and said armature having conical recesses therein, servo balls seated in the conical recesses in adjacent faces of the control member and the armature, spring means acting on said armature to hold the balls in the recess and to normally center them in the recesses, spring means anchored to the planetary sun gear urging said control member away from engagement with said brake member, and magnet means fixed to the casing and operable to hold said armature stationary whereby the balls are off-centered in the recesses and move the control member into engagement with the brake member.

6. In drive mechanism having a casing in which drive and driven shafts are connected by planetary gearing, the sun gear being loosely mounted on the drive shaft, the planet carrier being fixed to the drive shaft and the ring gear being fixed to the driven shaft, control mechanism for the planetary gearing comprising a brake member fixed to the casing, a clutch member fixed to the planet carrier, a control member slidably splined on the sun gear and engageable in one extreme position with the brake member and in the other extreme position with the clutch member, a pair of spring retainers fixed with the sun gear, springs seated against one retainer and engaging said control member to normally engage it with said clutch member, an armature adjacent the control member, springs connected to the other retainer and the armature urging the armature toward the control member, the adjacent faces of said armature and control member having registering conical recesses therein, servo balls in the registering recesses, and magnetic means fixed to the casing and operable to hold said armature stationary whereby the balls are off-centered in the recesses, and act to move said control member away from said clutch member and into engagement with said brake member.

7. In drive mechanism having a casing in which drive and driven shafts are connected by planetary gearing and an overrunning clutch, planetary gearing control means for modifying the drive between the shafts comprising a brake member anchored to the casing, a control member slidably splined to the planetary gearing sun gear and engageable with the brake member, an armature adjacent the control member, servo means acting between the armature and the control member, spring means acting on said armature to retain the servo means between the armature and the control member, spring means anchored to the planetary gearing sun gear urging said control member out of engagement with said brake member, and magnet means fixed to the casing and operable to hold said armature stationary, said armature when held stationary acting as an abutment for the servo means to cause said control member to engage with said brake member.

8. In drive mechanism having a casing in which drive and driven shafts are connected by planetary gearing, the planetary gearing sun gear being loosely mounted on the drive shaft, the planetary gearing carrier being fixed to the drive shaft and the ring gear being fixed to the driven shaft, control mechanism for the planetary gearing comprising a brake member fixed to the casing, a clutch casing fixed to the planetary gearing carrier, a control member slidably splined on the sun gear and engageable in one extreme position with the brake member and in the other extreme position with the clutch member, a pair of spring retainers fixed to rotate with the planetary gearing sun gear, springs seated against one retainer and bearing against the control member to normally urge it into engagement with the clutch member, an armature adjacent the control member, springs connected to the other retainer and the armature urging the armature toward the control member, servo means acting between the armature and the control member, and magnetic means fixed to the casing and operable to hold said armature stationary whereby the servo means will act to move said control member away from said clutch member and into engagement with said brake member.

WALTER R. GRISWOLD.